(12) United States Patent
Stein et al.

(10) Patent No.: US 7,912,302 B2
(45) Date of Patent: Mar. 22, 2011

(54) MULTIPROCESSOR DECODER SYSTEM AND METHOD

(75) Inventors: Yosef Stein, Sharon, MA (US); Gordon A. Sterling, Norfolk, MA (US)

(73) Assignee: Analog Devices, Inc., Norwood, MA (US)

( * ) Notice: Subject to any disclaimer, the term of this patent is extended or adjusted under 35 U.S.C. 154(b) by 1010 days.

(21) Appl. No.: 11/725,527

(22) Filed: Mar. 19, 2007

(65) Prior Publication Data
US 2008/0074426 A1    Mar. 27, 2008

Related U.S. Application Data

(60) Provisional application No. 60/846,189, filed on Sep. 21, 2006.

(51) Int. Cl.
| | |
|---|---|
| G06K 9/36 | (2006.01) |
| G06K 9/46 | (2006.01) |
| G06F 15/16 | (2006.01) |
| G06F 15/80 | (2006.01) |
| G06T 1/20 | (2006.01) |

(52) U.S. Cl. ........ 382/234; 382/232; 345/502; 345/505; 345/506

(58) Field of Classification Search .......... 382/232–253; 345/502

See application file for complete search history.

(56) References Cited

U.S. PATENT DOCUMENTS

| | | | | |
|---|---|---|---|---|
| 5,193,002 A | * | 3/1993 | Guichard et al. ........ | 375/240.12 |
| 5,589,885 A | * | 12/1996 | Ooi ........................... | 375/240.03 |
| 5,923,339 A | * | 7/1999 | Date et al. ..................... | 345/505 |
| 7,528,749 B2 | * | 5/2009 | Otsuka .......................... | 341/107 |
| 2003/0189982 A1 | * | 10/2003 | MacInnis ................. | 375/240.24 |
| 2004/0218819 A1 | * | 11/2004 | Satoh ............................. | 382/232 |
| 2005/0094729 A1 | | 5/2005 | Yuan et al. | |
| 2005/0175250 A1 | * | 8/2005 | Watanabe et al. ............. | 382/247 |
| 2006/0174236 A1 | | 8/2006 | Stein et al. | |
| 2007/0098276 A1 | * | 5/2007 | Reese ........................... | 382/234 |
| 2008/0074426 A1 | * | 3/2008 | Stein et al. .................... | 345/502 |

FOREIGN PATENT DOCUMENTS

| | | | |
|---|---|---|---|
| EP | 1339022 A2 | * | 8/2003 |
| EP | 1684435 A1 | | 7/2006 |
| JP | 01082874 A | * | 3/1989 |

OTHER PUBLICATIONS

International Search Report for PCT Application No. PCT/US2007/020146, mailed Mar. 7, 2008, 1 page.
Written Opinion for PCT Application No. PCT/US2007/020146, mailed Mar. 7, 2008, 4 pages.
Erik B. van der Tol, Egbert G.T. Jaspers and Rob H. Gelderblom, *Mapping of H.264 decoding on a multiprocessor architecture*, Philips Research Laboratories, Eindhoven, The Netherlands, Proceedings of SPIE—IS&T Electronic Imaging, SPIE vol. 5022, 2003, p. 707-718.

* cited by examiner

*Primary Examiner* — Samir A Ahmed
*Assistant Examiner* — Li Liu
(74) *Attorney, Agent, or Firm* — Bingham McCutchen LLP

(57) ABSTRACT

Multiprocessor decoding is accomplished in a first mode by generating with a series of n processors, from a set of data macroblocks, the entropy decoding output of each data macroblock and storing the entropy decoding output of each data macroblock in n storage elements, respectively, associated with the processors and in the second mode decoding the macroblock data from its associated storage element in response to the macroblock entropy decoding output from its associated storage element stored in an nth previous period, predetermined data from one or more adjacent macroblocks, and data produced from a previous processor in the series.

18 Claims, 6 Drawing Sheets

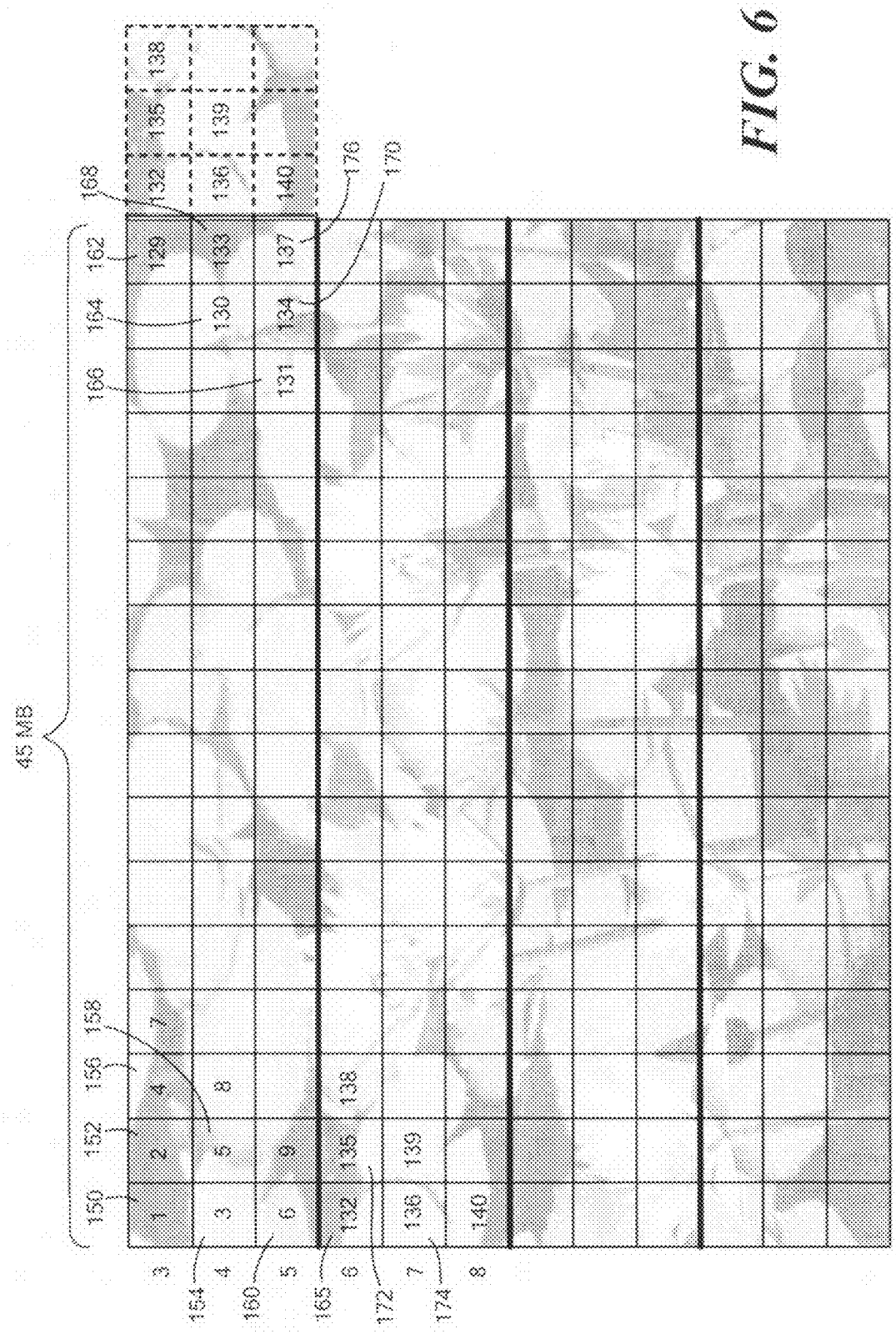

MULTIPROCESSOR DECODER SYSTEM AND METHOD

This application claims benefit of and priority to U.S. Provisional Application Ser. No. 60/846,189 filed Sep. 21, 2006 incorporated herein by this reference.

FIELD OF THE INVENTION

An improved multiprocessor decoder system and method.

BACKGROUND OF THE INVENTION

Most video compression-decompression (codec operations) use block based processing with typically 16×16 pixel macroblocks (MBs). Video coding of a MB generally involves dependency on one or more pixels of adjacent MBs. For example, in H.264 specifications, CABAC context modeling depends on up to two neighboring MBs in the past of the current MB. Usually, the neighboring MBs are to the left and on the top of the current MB. In prediction of intra macroblocks, the encoder may select one of nine prediction modes. To support all these modes up to 37 pixels one from the top left, sixteen from the top, four from the top right and sixteen from the left neighboring MBs are used as prediction samples.

As images are becoming bigger and bigger, for example, High Definition 1080p (1920×1080@60 Hz) with 30 cycle/pixel, a $3.8^+$ GHz processor will be required just for the video decoder. A processor with such processing power is not yet available.

Given the neighboring MBs constraint, one approach is to decode the current MB faster and faster with bigger and faster dedicated hardware blocks that are designed to keep up with the real time needs. This approach usually leads to a set of dedicated hardware blocks for each of the video compression standards which is big in area and takes a lot of time to design and debug.

The other approach is to try and solve it using an array of processing elements working in parallel on different image MBs. One problem with this approach is that CABAC or entropy coding is a serial process that can't be "parallelized", i.e. one must finish the current element CABAC decode process before the next one can start.

Another approach uses multiprocessor architecture to map H.264 decoding so that an entire image frame is parsed and entropy decoded and then a number of additional processors are used to execute the transform and other operations that may be necessary such as intra-prediction, motion compensation and loop filtering. One problem with this approach is that a full memory for an entire frame of macroblock entropy decoding is required. See MAPPING OF H.264 DECODING ON A MULTIPROCESSOR ARCHITECTURE, BY van der Tol et al., Proc. Of SPIE Vol. 5022, pgs 707-718.

BRIEF SUMMARY OF THE INVENTION

It is therefore an object of this invention to provide an improved multiprocessor decoder system and method.

It is a further object of this invention to provide such an improved multiprocessor decoder system and method which reduces required storage such as for entropy decoding.

It is a further object of this invention to provide such an improved multiprocessor decoder system and method which has a balanced algorithm partitioning, leading to higher processor utilization efficiency.

It is a further object of this invention to provide such an improved multiprocessor decoder system and method which has linear scalability to different image resolution.

It is a further object of this invention to provide such an improved multiprocessor decoder system and method which reduces the number of processing elements required at a given video resolution (i.e. cost savings).

It is a further object of this invention to provide such an improved multiprocessor decoder system and method which is implementable in software processors without additional dedicated hardware e.g. ASIC or FPGAs.

It is a further object of this invention to provide such an improved multiprocessor decoder system and method wherein each processor immediately consumes the data passed from the previous processor reducing the overall system memory bandwidth area and power.

The invention results from the realization that improved multiprocessor decoding can be achieved, by a series of n processors operating in two modes where the first and second modes are executed by the processors on different macroblocks of the same image, wherein the a series of n processors, are responsive in a first mode to a set of data macroblocks, to generate and store the entropy decoding output of each data macroblock in n storage elements, respectively, associated with the processors and in a second mode to decode the macroblock data from its associated storage element in response to the macroblock entropy decoding output from its associated storage element in an nth previous period, predetermined data from one or more adjacent macroblocks, and data produced from a previous processor in the series. Each processor responds in the second mode to completion of at least the data dependency portion of its processing operation before enabling the next processor in the series to operate in the second mode and each processor is responsive in the first mode upon completion of generation of the entropy decoding output to generate an enable signal to enable the next processor in the series to operate in the first mode. The last processor in the series of processors is responsive to completion of its processing operation in the second mode to generate an enable signal to shift the series of processors to the next set of data macroblocks.

The subject invention, however, in other embodiments, need not achieve all these objectives and the claims hereof should not be limited to structures or methods capable of achieving these objectives.

This invention features a multiprocessor decoder system including a series of n processors which are responsive in a first mode to a set of data macroblocks to generate and store the entropy decoding output of each data macroblock in n storage elements, respectively, associated with the processors. The series of n processors are, in a second mode, responsive to the macroblock entropy decoding output from its associated storage element in an nth previous period, predetermined data from one or more adjacent macroblocks, and data produced from a previous processor in the series to decode the macroblock data from its associated storage element. Each processor is responsive in the second mode to completion of it at least the data dependency portion of its processing operation before enabling the next processor in the series to operate in the second mode. Each processor is responsive in the first mode upon completion of generation of the entropy decoding output to generate an enable signal to enable the next processor in the series to operate in the first mode. The last processor in the series of processors is responsive to completion of its processing operation in the second mode to generate an enable signal to shift the series of processors to the next set of data macroblocks.

In a preferred embodiment a processor may include a digital signal processor. The processors may be interconnected by a bus which carriers both data and enable signals. Each data storage element may hold an image line of macroblock entropy decoding output. The first and second modes may be executed by the processors on different macroblocks of the same image. In the first mode a processor may execute parsing and entropy decoding and in the second mode a transform. The processor in the second mode may further execute at least one of intra-prediction, motion compensation and deblocking filtering. The entropy decoding may be CABAC; or CAVLC. The processor may have associated with it a storage device for storing the data produced by the last processor in the series for access by the first processor in the series after the series of processors have been shifted to the next set of macroblocks.

The invention also features a multiprocessor decoding method including in a first mode generating with a series of n processors from a set of data macroblocks the entropy decoding output of each data macroblock and storing the entropy decoding output of each data macroblock in n storage elements, respectively, associated with the processors. In a second mode the processor decodes the macroblock data from its associated storage element in response to a macroblock entropy decoding output from its associated storage elements stored in a nth previous period, predetermined data from one or more adjacent macroblocks and data produced from a previous processor in the series. Each processor enables in the second mode upon completion of at least the data dependency portion of its processing operation the next processor in the series to operate in the second mode. Each processor also generates in the first mode upon completion of generation of the entropy decoding output an enable signal to enable the next processor in the series to operate in the first mode. An enable signal is generated to shift the series of processors to the next set of data macroblocks upon the last processor in the series of processors completing its processing operation in the second mode.

In a preferred embodiment the first and second modes may be executed by the processors on different macroblocks of the same image. In the first mode a processor may execute parsing and entropy decoding and in the second mode may execute a transform. The processors in the second mode may further execute at least one of intra-prediction motion compensation and deblocking filtering. The entropy decoding may be CABAC; it may CAVLC. The data produced by the last processor in the series may be stored for access by the first processor in the series after the series of processors have been shifted to the next set of macroblocks.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 6 is a schematic illustration of the order in which the macroblocks in an image are processed including the wraparound from the end of one set of macroblocks to the beginning of the next.

DETAILED DESCRIPTION OF THE INVENTION

Figure 1:
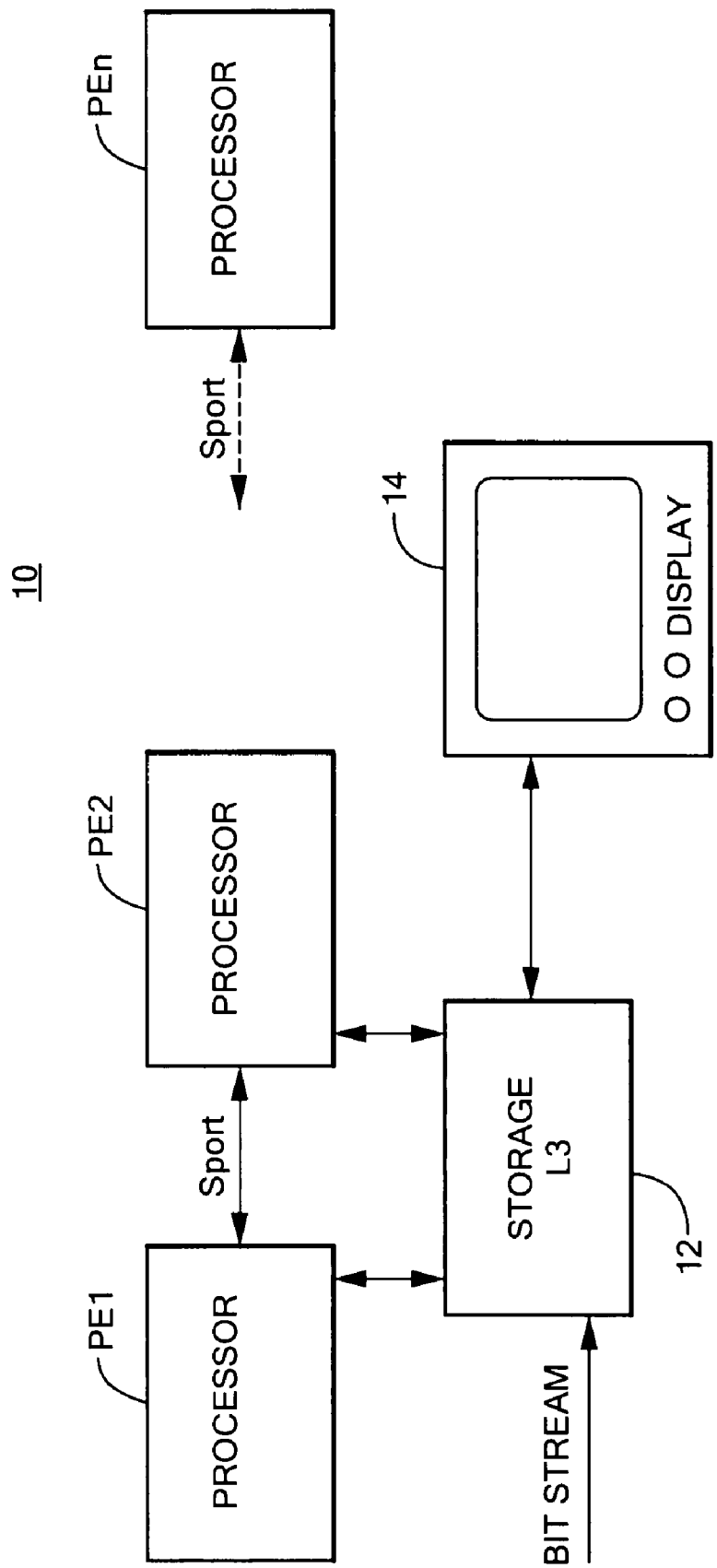
FIG. 1 is a block diagram of a multiprocessor decoder system including a series of processors according to one embodiment of this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 a multiprocessor decoder system 10 according to this invention including a series of n processors PE1, PE2. PEn, a storage device 12 such as a class L3 storage device and a display device 14. Video image data is provided in a bit stream of data macroblocks to storage 12 and the series of processors PE1, PE2 . . . PEn operates on a set of data macroblocks to produce an image which is returned to storage 12 which in turn delivers it to display 14.

Figure 2:
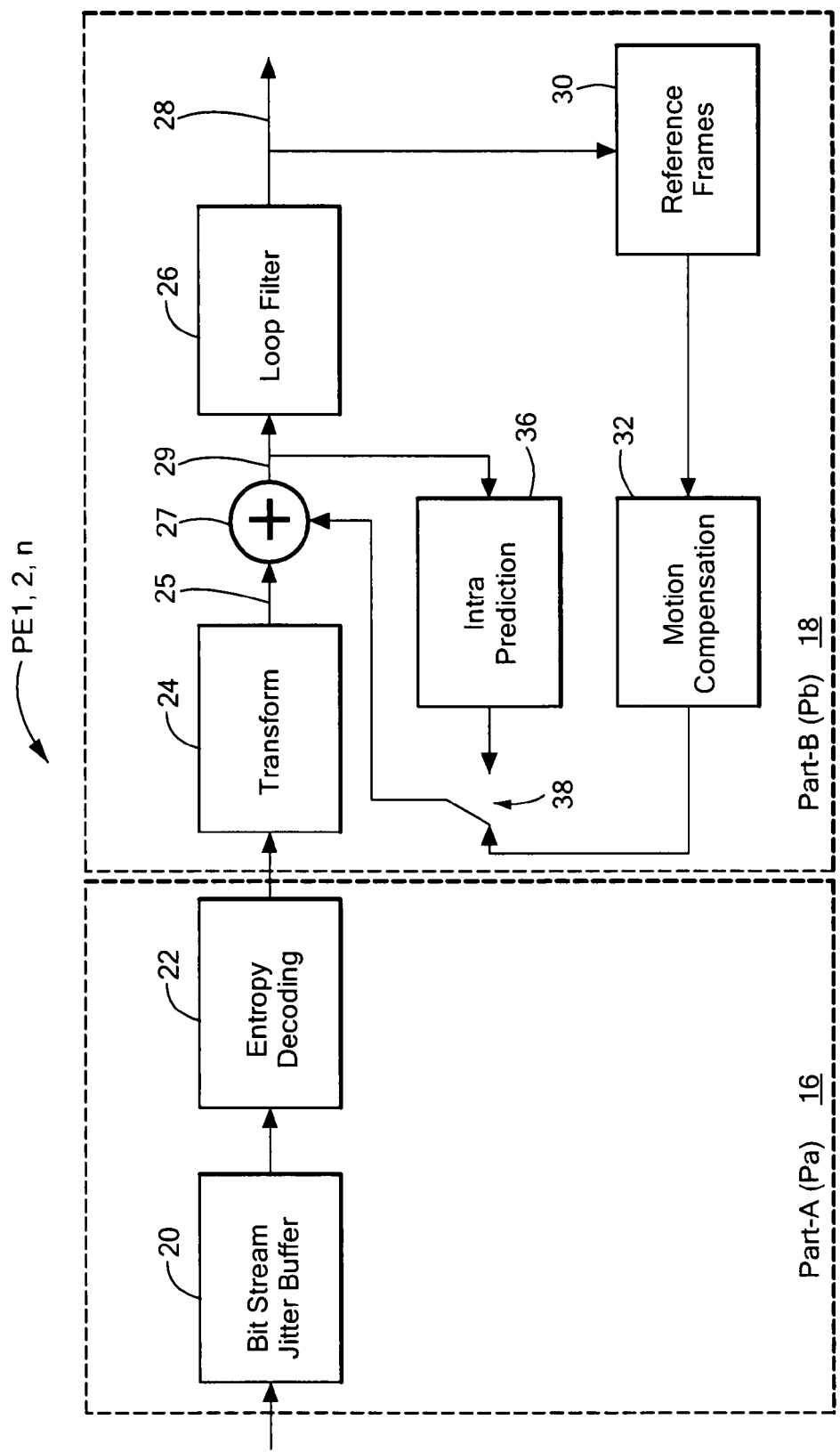
FIG. 2 is a flow block diagram of a processor of FIG. 1 illustrating its two modes of operation.

Each processor PE1, PE2 . . . PEn, which may be implemented with a DSP, is configured to operate in two modes as shown by the functional flow diagram in FIG. 2, where mode one 16 is performed by Part A, and mode two 18 is performed by Part B. In Part A the compressed bit stream representing the 16×16 pixel MB is delivered from the bit stream jitter buffer 20 to the input of entropy decoding circuit 22, such as CABAC, or CAVLC. In Part B the entropy decoded coefficients are submitted to scaling and inverse transform circuit 24 whose outputs are the residual MB data for the current MB. This is supplied on line 25 to summing circuit 27. The output 29 of summing circuit 27 comprising the reconstructed MB is submitted to loop filter or de-blocking filter 26. The output of filter 26 is the reconstructed image 28 in the form of 16×16 pixel tiled MBs which have been reassembled and have had their boundaries filtered to reduce blocking artifacts. The output of loop filter 26 is also used to reconstruct the reference frames 30. The intra prediction circuit 36 uses unfiltered previous decoded MBs to predict current MB data. The motion compensation circuit 32 uses out of order predicted (P) and bidirectional predicted (B) reference frames to reconstruct a similar MB region for a recently decoded reference video frame. Depending on the MB type (intra, inter) switch 38 position is set and the intra predicted or the motion compensated MB is added in summing circuit 27 to the residual MB data 25 to generate the current reconstructed MB.

Conventionally, Part B 18 in the second mode operates on the same data macroblock as Part A 16 does in the first mode. Thus the operation in Part B, the second mode 18, must wait until the entropy decoding 22 is completed. This is a complex and time consuming operation. In contrast, in this invention the first mode, Part A 16 and the second mode, Part B 18 operate on different macroblocks: while Part A 16 is operating in the first mode on macroblock "K", for example, Part B 18 is operating in the second mode on the entropy decoded output of a previous data macroblock "J" which had been stored n periods earlier, where n is the number of processors in the series of processors. A simple example using the H.264 standard will help clarify the invention.

Figure 3:
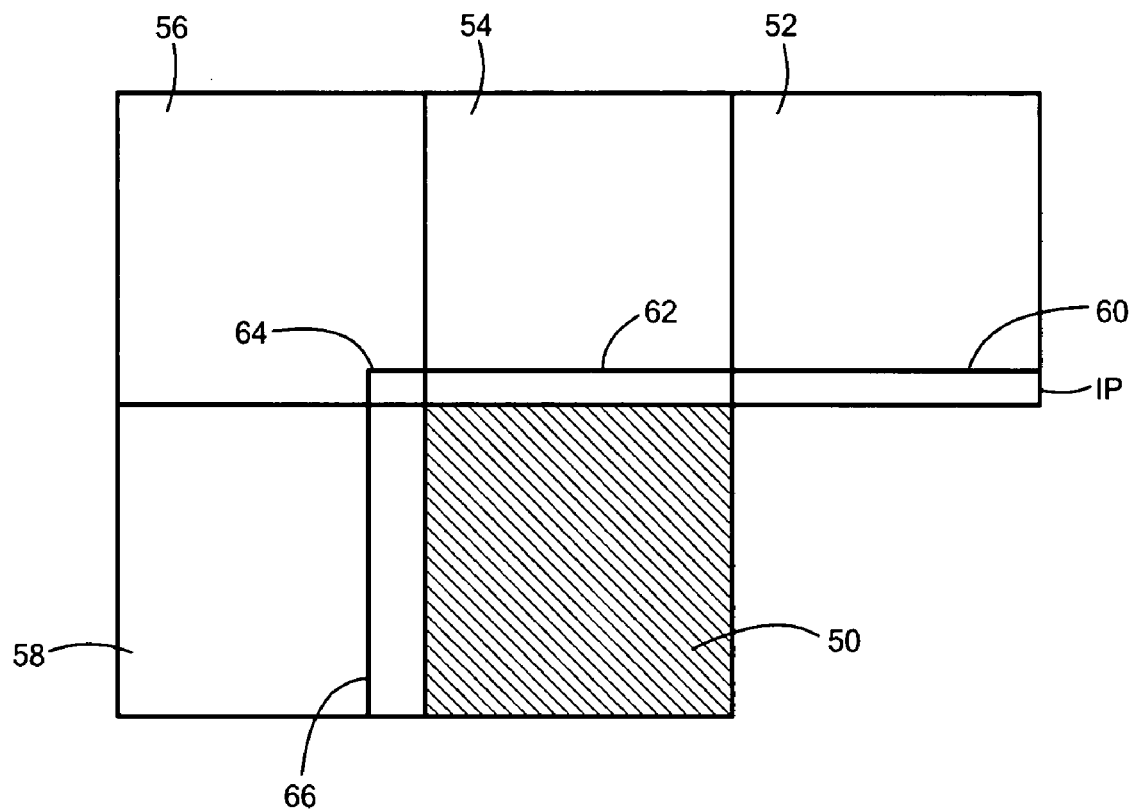
FIG. 3 is a schematic diagram illustrating data dependency of neighboring macroblocks in H.264 and CABAC applications.

There is shown in FIG. 3 a macroblock 50. To process the data in macroblock 50, data output from a number of different neighboring macroblocks may be necessary. For example, in the H.264 standard used in this example the output data from the processing of the upper right macroblock 52, upper center macroblock 54, upper left macroblock 56 and the previous macroblock 58 is required. This is so because with that standard when intra prediction is required the bottom line of pixels 60 from macroblock 52, the bottom line of pixels 62 from macroblock 54, the single pixel 64 at the lower right corner of macroblock 56 and right most column 66 of pixels in macroblock 58 are implicated in the processing of data in macroblock 50.

Figure 4:
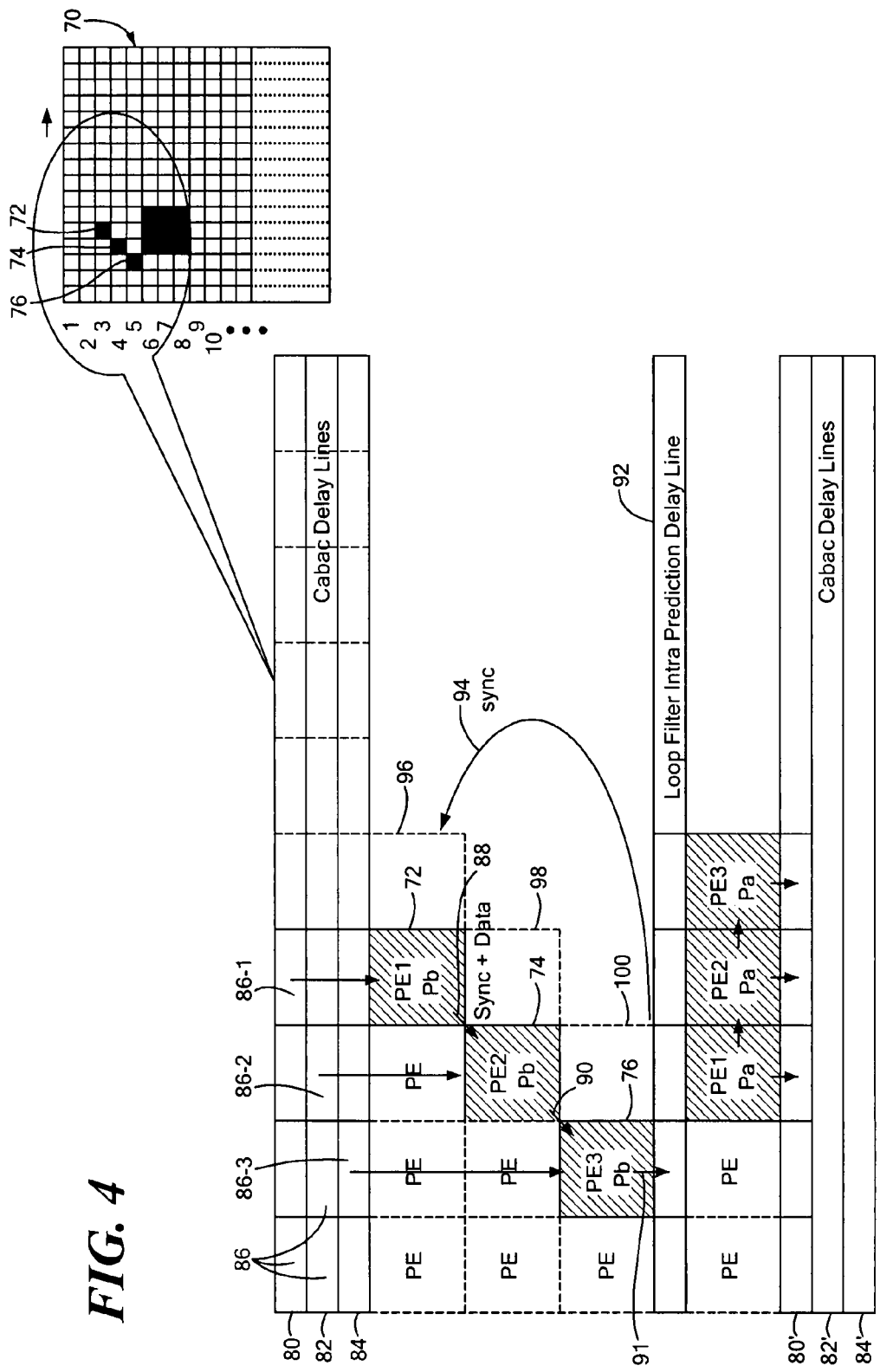
FIG. 4 is a schematic diagram illustrating in greater detail the dual mode operation of a series of processors.

Assuming now for the sake of simplicity an image 70, FIG. 4, made up of a matrix of 16 by 16 macroblocks. Assuming further that the series of processors contains but three processors, that is, n equals 3 and that those processors PE1, PE2 and PE3 are operating on macroblocks 72, 74, and 76 and are stepping across rows 3, 4, and 5 of image 70. Referring now to the enlarged more detailed portion of FIG. 4, processors PE1, PE2, and PE3 are operating in the second mode indicated by Pb. There are accordingly n storage elements 80, 82, and 84 corresponding to the (n) three rows on lines of macroblocks 3, 4 and 5 in image 70. The number of storage elements is commensurate with the number of processors and may be implemented, for example, by CABAC delay lines. Each storage element 80, 82, 84 is composed of sections 86, each section of which stores the entropy decoding output of a particular data macroblock in the set of macroblocks constituted by rows 3, 4 and 5 of image 70.

In operation, processor PE1 performs the second mode or Part B 18 operations employing the entropy decoding output of its associated storage element, i.e. the entropy decoding output of the data macroblock in section 86-1. It also receives required data from one or more adjacent macroblocks and the data produced from a previous processor in the series to decode the macroblock data from that associated section 86-1. Processor PE2 upon receiving from processor PE1 the necessary data upon which it is dependent begins its operation using the entropy decoding output of another data macroblock which is stored in section 86-2 of storage element 82 and likewise processor PE3 after receiving from processor PE2 the data from which it is dependent accesses the entropy decoding output of yet another data macroblock from section 86-3 of storage element 84. Understand however, in accordance with this invention the entropy decoding output present in storage elements 80, 82, and 84 are from the n or three rows of data macroblocks prior to the present rows 3, 4, 5 of image 70.

Each time a processor finishes its operation it sends any dependent data and a sync signal to the next processor. Processors 72, 74, 76 are interconnected by buses 88, 90, 91 which carry both data and sync signals. For example, when processor PE1 completes its operation or so much of it as can provide the data dependency portion to processor PE2, it sends to processor PE2 on bus 88 a sync signal and the data on which processor PE2 is dependent. Likewise, when processor PE2 completes the portion of its operation which provides the data on which processor PE3 is dependent, it sends on bus 90 a sync signal and the dependent data to processor PE3. Each storage element 80, 82, 84 includes sixteen sections, (not all shown) commensurate with the sixteen data macroblocks contained in each row of image 70. But this is not a necessary limitation of the invention, as storage elements 80, 82, 84 will contain whatever number of sections required to match the number of data macroblocks in the rows of the image.

While the Part B's 18 of the series of processors, PE1, PE2, PE3 are processing data from storage elements 80, 82, and 84 in the second mode, Part A's 16 of the same processors PE1, PE2, and PE3 are operating one after the other in the first mode in accordance with Part A 16 to generate the entropy decoding output of each data macroblock from the next rows 6, 7, 8 of data macroblocks in image 70 and storing them in storage elements 80', 82', and 84' even as the previous entropy decoding outputs of the macroblocks are being used by the second mode or Part B 18 operations. Storage elements 80', 82', 84' are depicted as separate from storage elements 80, 82, 84 but this is for ease of understanding only as they are one in the same structures. There is only one set of storage elements which service the processors in both the second mode or Part B operation and the first mode or Part A 16 operation.

Another storage device 92, for example a loop filter and intra prediction delay line, is provided to receive the output from the last processor PE3 operating in the second mode Part B 18. The output from the last processor PE3 in FIG. 4 is stored in storage device 92 because there is no further processor to which it can pass its data and so it passes it over bus 91 to storage device 92. When the decoding process reaches the end of row and wraps around to begin processing the next n rows, 6, 7 and 8, storage device 92 provides PE1 its depended data form the previous rows. The next round of operation occurs when the last processor PE3 finishes and sends the sync signal on line 94 to processor PE1. At that point each of the processors is shifted to the next data macroblock in the row. Processor PE1 is now assigned to data macroblock 96, processor PE2 to data macroblock 98 and processor PE3 to data macroblock 100.

Figure 5:
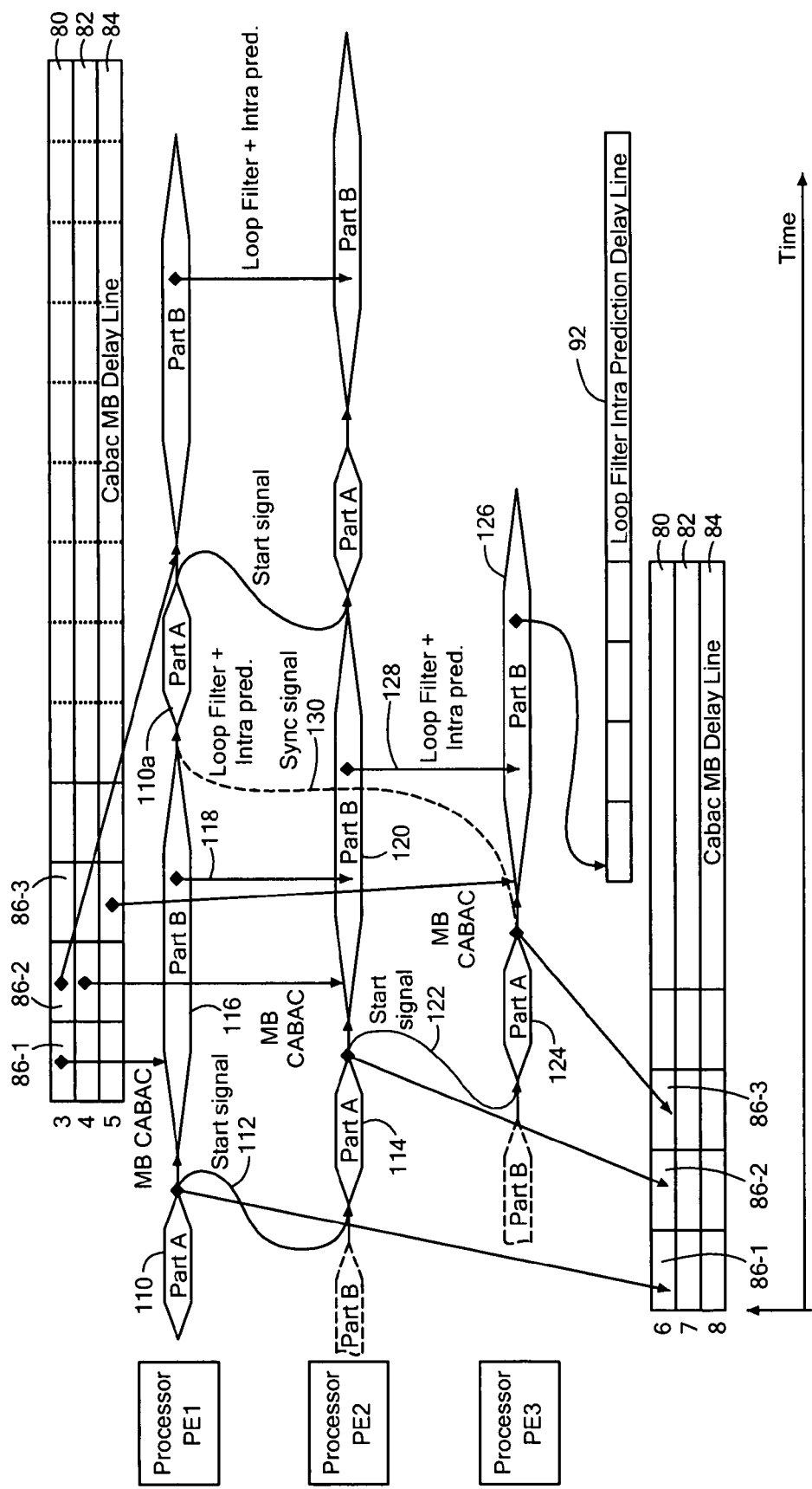
FIG. 5 is a flow chart illustrating the method of this invention.

The method of this invention is shown is FIG. 5, in steady state operation processor PE1 begins in the first mode Part A 110. As soon as it completes the first mode it deposits the entropy decoding output of the macroblock in section 86-1 of storage element 80' corresponding to row 6 of image 70. It then provides a start signal on line 112 to processor PE2 to switch to the first mode Part A 114. Processor PE1 after completing Part A 110 then switches to the second mode, Part B 116, whereupon it draws the entropy decoding output from section 86-1 of storage element 80 from the nth previous round of operation. In this example, where n is three, it would be the third previous round of operation. Processor PE1 then continues in Part B 116 and, if, at some point before it finishes, it has nevertheless completed all of the data dependency portion of its processing, then as indicated as line 118 it provides that dependent data to processor PE2 for its Part B 120 operation in the second mode. Processor PE2 operating in the second mode, Part B 120, and having its dependent data 118 from processor PE1, can now also draw down the entropy decoding output of another macroblock from section 86-2 of storage element 82 and complete its processing. In the meantime the completion by processor PE2 in mode one of Part A 114 causes it to send a start signal on line 122 to processor PE3 to begin operation in the first mode, Part A 124. When processor PE2 completes mode one in Part A 114 it provides that entropy decoding output of the macroblock to section 86-2 of storage element 82 corresponding to row 7 of image 70.

After processor PE3 completes its first mode operation, Part A 124, it begins the second mode of operation, Part B 126, upon receiving whatever dependent data is necessary 128, and retrieving the entropy decoding output of the corresponding macroblock from section 86-3 of storage element 84. Here again storage elements 80, 82, and 84 are represented twice, once to show the storage of the entropy decoding output from the data macroblocks of rows 3, 4, and 5 of image 70 at the top of the figure and the second time at the bottom of the figure to represent the entropy decoding output of each of the data macroblocks from rows 6, 7 and 8 presently being stored in storage elements 80, 82, 84.

When processor PE3 has completed its operation in the second mode, Part B 126, it provides whatever data dependency portion may be required to storage device 92 since it has no next processor in the series to which to forward that data. Storage device 92 then holds that data and provides it to the first processor PE1 on the next period of operation. When processor PE3, the last processor, completes its first mode, Part A 124, in addition to moving into the second mode, Part B 126 operation, it also sends a signal on line 130 to processor PE1 to begin again Part A 100a and the entire round of operation begins again.

In this manner each processor is being used to perform both the first and second mode operations, that is the Part A and Part B operations but without the incumbent delay that occurs when the Part B operation has to wait on the completion of the Part A operation for the same macroblock. For here, with this invention, the Part A's of each data macroblock have been performed n periods ahead of time on each macroblock so that they are there and ready whenever the processor is available to work on those respective macroblocks in the second mode in Part B. This provides a more efficient and balanced use of the processors conserving space, power and cost. The processing continues along the three rows, 3, 4 and 5, for example, until it reaches the end of line which may be 16 macroblocks long or 32 or 45 macroblocks long and then wraps around and begins processing the next three or n rows, 6, 7 and 8.

In FIG. 6 there is shown the order in which the macroblocks are processed. The first macroblock processed is macroblock 150 in the upper left hand corner. Then macroblocks 152 and 154 are the second and third macroblocks processed, respectively. The fourth, fifth and sixth macroblocks processed are 156, 158 and 160. This continues as shown until $129^{th}$, $130^{th}$ and $131^{st}$ processing operations indicated at 162, 164 and 166. The $132^{nd}$ macroblock to be processed is now in the upper left hand corner of row 6 at 165. But the remainder of those macroblocks 133 and 134 at 168 and 170 are still in rows 4 and 5. Finally in the next shift the processors are processing $135^{th}$ and $136^{th}$ and $137^{th}$ macroblocks where the $135^{th}$ and $136^{th}$ 172, and 174 are at the left hand end of rows 6 and 7 while the $137^{th}$ macroblock 176 is at the very right end of row 5. Following that the $138^{th}$, $139^{th}$, and $140^{th}$ data macroblocks being processed are fully within rows 6, 7, and 8 and the system operates accordingly.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A multiprocessor decoder system comprising:
    a plurality of connected processors processing a set of data macroblocks, each processor having a first mode to generate and store an entropy decoding output for a data macroblock in an associated storage element and a second mode to retrieve and decode stored macroblock data from associated storage elements in response to a previously stored macroblock entropy decoding output, predetermined data from at least one adjacent macroblocks, and data from another connected processor;
    each processor in the second mode at least partially completing the decode of the stored macroblock data before enabling the next connected processor to operate in the second mode;
    each processor in the first mode generating an enable signal upon completion of the generation of the entropy decoding output to enable the next connected processor to operate in the first mode; and
    the last connected processor generating an enable signal upon completion of its processing operation in the second mode to shift the series of processors to the next set of data macroblocks.

2. The multiprocessor decoder system of claim 1 in which each said processor includes a digital signal processor.

3. The multiprocessor decoder system of claim 1 in which said processors are interconnected by a bus which carries both data and enable signals.

4. The multiprocessor decoder system of claim 1 in which each said storage element holds an image line of macroblock entropy decoding output.

5. The multiprocessor decoder system of claim 1 in which said first and second modes are executed by said processors on different macroblocks of the same image.

6. The multiprocessor decoder system of claim 1 in which in said first mode a said processor executes parsing and entropy decoding and in said second mode executes a transform.

7. The multiprocessor decoder system of claim 6 in which a said processor in said second mode further executes at least one of intra-prediction, motion compensation and de-blocking filtering.

8. The multiprocessor decoder system of claim 1 in which said entropy decoding is context-based adaptive binary arithmetic coding.

9. The multiprocessor decoder system of claim 1 in which said entropy decoding is context-based adaptive variable length coding.

10. The multiprocessor decoder system of claim 1 in which each said processor has associated with it a storage device for storing the data produced by the last connected processor for access by the first connected processor after the connected processors have been shifted to the next set of macroblocks.

11. A multiprocessor decoding method comprising:
    providing a plurality of connected processors and a set of data macroblocks;
    generating with a processor in a first mode an entropy decoding output for a data macroblock and storing the generated entropy decoding output in a storage element associated with said processor;
    retrieving and decoding the stored macroblock data from the associated storage element with the processor in a second mode in response to a previously stored macroblock entropy decoding output, predetermined data from at least one adjacent macroblock, and data from another connected processor;

each processor, in the second mode at least partially completing the decode of the stored macroblock data before enabling the next connected processor to operate in the second mode; each processor in the first mode generating an enable signal upon completion of the generation of the entropy decoding output to enable the next connected processor to operate in the first mode; and the last connected processor generating an enable signal upon completion of its processing operation in the second mode to shift the connected processors to the next set of data macroblocks.

12. The multiprocessor decoding method of claim 11 in which said first and second modes are executed by said processors on different macroblocks of the same image.

13. The multiprocessor decoding method of claim 11 in which in said first mode a said processor executes parsing and entropy decoding and in said second mode executes a transform.

14. The multiprocessor decoding method of claim 13 in which a said processor in said second mode further executes at least one of intra-prediction, motion compensation and de-blocking filtering.

15. The multiprocessor decoding method of claim 11 in which each said storage element holds an image line of macroblock entropy decoding output.

16. The multiprocessor decoding method of claim 11 in which said entropy decoding is context-based adaptive binary arithmetic coding.

17. The multiprocessor decoder method of claim 11 in which said entropy decoding is context-based adaptive variable length coding.

18. The multiprocessor decoder method of claim 11 further including storing the data produced by the last connected processor for access by the first connected processor after the connected processors have been shifted to the next set of macroblocks.

* * * * *